United States Patent
Chiang et al.

(10) Patent No.: US 8,867,833 B2
(45) Date of Patent: Oct. 21, 2014

(54) IMAGE PROCESSING METHOD

(71) Applicant: ILI Technology Corporation, Jhubei (TW)

(72) Inventors: Tsung-Hsi Chiang, Jhubei (TW); Ching-Fang Hsiao, Jhubei (TW)

(73) Assignee: ILI Technology Corporation, Jhubei (TW)

( * ) Notice: Subject to any disclaimer, the term of this patent is extended or adjusted under 35 U.S.C. 154(b) by 92 days.

(21) Appl. No.: 13/830,996

(22) Filed: Mar. 14, 2013

(65) Prior Publication Data
US 2014/0270514 A1 Sep. 18, 2014

(51) Int. Cl.
*G06K 9/00* (2006.01)
*G06T 5/00* (2006.01)

(52) U.S. Cl.
CPC ................................. *G06T 5/001* (2013.01)
USPC ........... 382/167; 382/162; 382/165; 382/254; 382/274

(58) Field of Classification Search
USPC ......... 382/162, 164, 165, 167, 168, 173, 266, 382/254, 274; 345/604; 348/719, E9.025; 358/1.9, 3.27, 515, 518, 520, 535; 706/20; 707/E17.022, E17.028
See application file for complete search history.

(56) References Cited

U.S. PATENT DOCUMENTS

| 6,757,427 B1 * | 6/2004 | Hongu ........................ 382/164 |
| 6,892,193 B2 * | 5/2005 | Bolle et al. ...................... 706/20 |
| 7,394,931 B2 * | 7/2008 | Shimizu ........................ 382/168 |

* cited by examiner

*Primary Examiner* — Anh Do
(74) *Attorney, Agent, or Firm* — Steptoe & Johnson LLP

(57) ABSTRACT

An image processing method is adapted for color enhancement of an original image pixel. The original image pixel is composed of a plurality of pixel components each having a component value. The image processing method includes: determining a hue region to which the original image pixel belongs based directly on the component values of the pixel components thereof; selecting a color enhancement parameter corresponding to the determined hue region; and obtaining a color enhanced pixel according to the selected color enhancement parameter and the component values of the pixel components of the original image pixel.

7 Claims, 5 Drawing Sheets

IMAGE PROCESSING METHOD

BACKGROUND OF THE INVENTION

1. Field of the Invention

The invention relates to an image processing method, and more particularly to an image processing method for color enhancement.

2. Description of the Related Art

Referring to FIG. 1, a conventional image processing device is shown to include an RGB-HSL conversion unit 11, a hue region determining unit 12, a parameter selecting unit 13, a color enhancing unit 14, and an HSL-RGB conversion unit 15.

The RGB-HSL conversion unit 11 receives an original image and converts each original image pixel from an RGB color space into an HSL color space.

The hue region determining unit 12 determines, for each original image pixel, a hue region to which the original image pixel belongs according to a hue component H thereof.

The parameter selecting unit 13 selects, for each original image pixel, a color enhancement parameter from a color enhancement parameter set, the selected color enhancement parameter corresponding to the hue region determined by the hue region determining unit 12.

For each original image pixel, the color enhancing unit 14 multiplies a saturation component S of the original image pixel by the corresponding color enhancement parameter selected by the parameter selecting unit 13 to obtain an enhanced saturation component S'.

The HSL-RGB conversion unit 15 obtains, for each original image pixel, a color enhanced pixel (R', G', B') according to the hue component H, the enhanced saturation component S', and the luminance component L, so as to output a color enhanced output image.

As described above, the conventional image processing device needs to convert the original image pixels from the RGB color space into the HSL color space prior to color enhancement processing, and to convert the color enhanced pixels from the HSL color space back to the RGB color space, resulting in large power consumption and large required chip area.

SUMMARY OF THE INVENTION

Therefore, an object of the present invention is to provide an image processing method that can overcome the above drawbacks of the prior art.

According to the present invention, an image processing method is provided for processing an original image pixel composed of a plurality of pixel components each having a component value. The image processing method is implemented by an image processing device and comprises:

a) configuring the image processing device to determine, from a plurality of predetermined hue regions, the hue region to which the original image pixel belongs based directly on the component values of the pixel components thereof;

b) configuring the image processing device to select a color enhancement parameter corresponding to the hue region determined in step a); and c) configuring the image processing device to obtain a color enhanced pixel according to the color enhancement parameter selected in step b) and the component values of the pixel components of the original image pixel.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
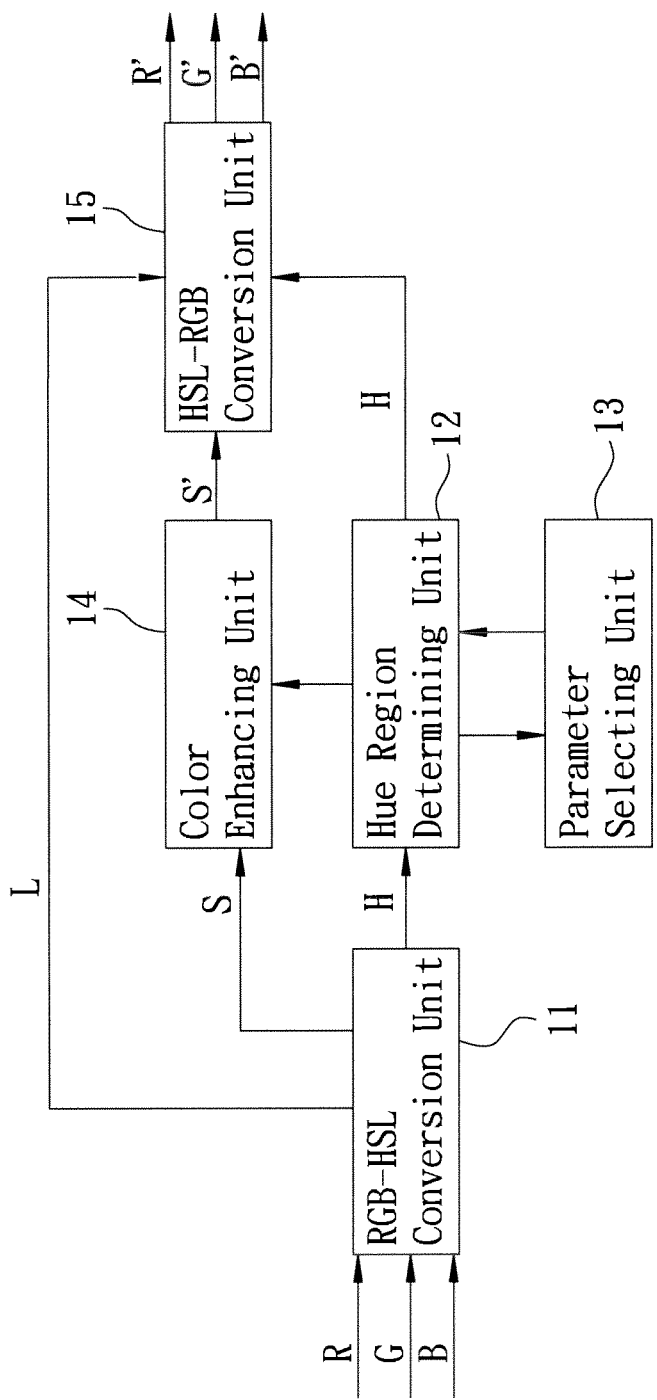
FIG. 1 is a block diagram illustrating a conventional image processing device.
Figure 2:
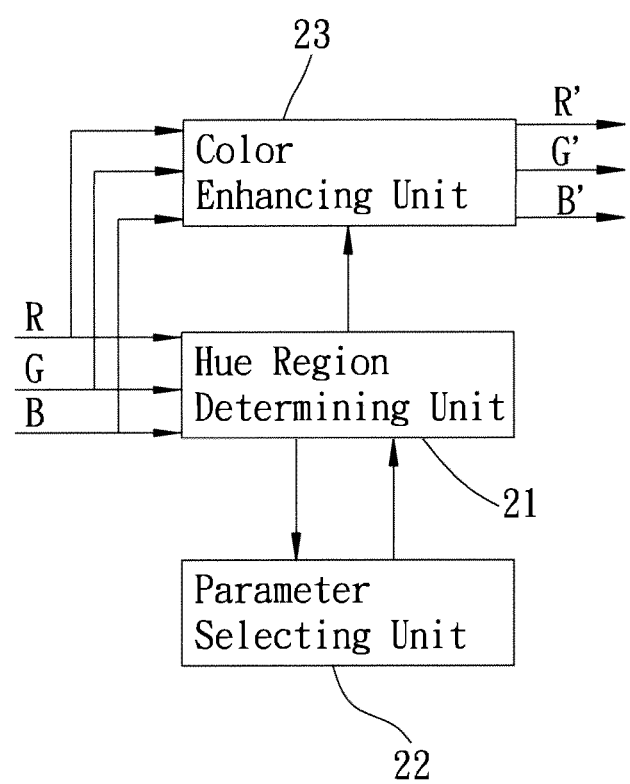
FIG. 2 is a block diagram illustrating an image processing device for implementing a preferred embodiment of the image processing method according to the present invention.
Figure 3:
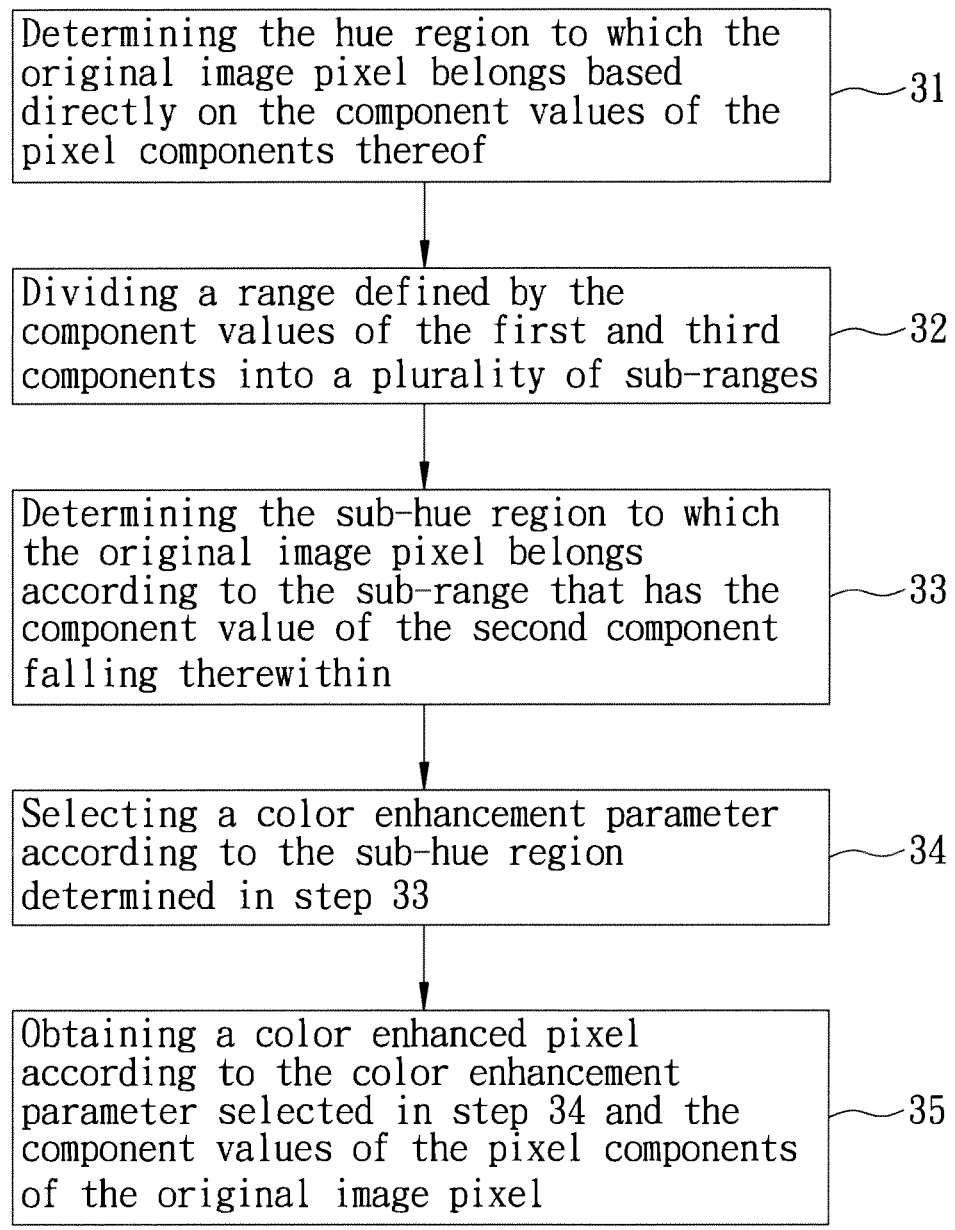
FIG. 3 is a flow chart illustrating steps of the preferred embodiment of the image processing method according to the present invention.

Referring to FIG. 2 and FIG. 3, the preferred embodiment of the image processing method for processing an original image pixel according to this invention is implemented by an image processing device. The original image pixel is composed of a plurality of pixel components, and each pixel component has a component value. The pixel components include a first component having the largest component value $max1$ of the original image pixel, a second component having the component value $mid1$, and a third component having the smallest component value $min1$ of the original image pixel. In this preferred embodiment, the pixel components of the original image pixel are red-green-blue (RGB) color space components.

The image processing device includes a hue region determining unit 21, a parameter selecting unit 22, and a color enhancing unit 23 for implementing the following steps of the preferred embodiment of the image processing method.

Figure 4:
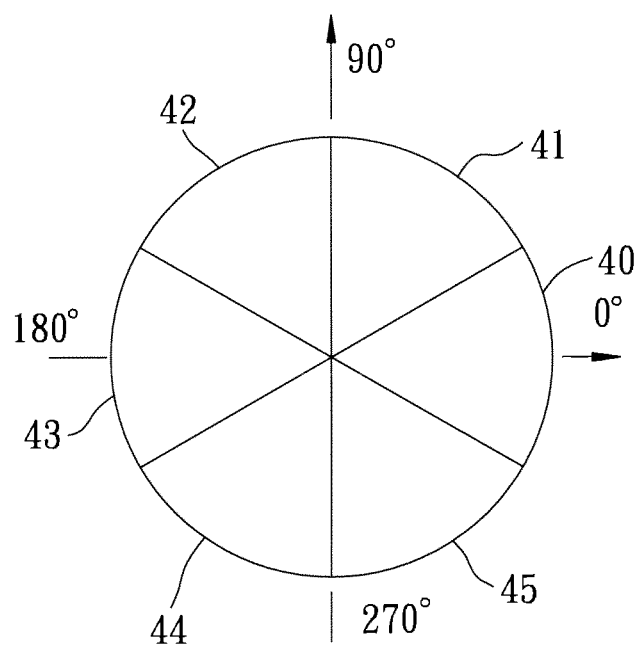
FIG. 4 is a schematic diagram illustrating hue regions defined in the preferred embodiment.
Figure 5:
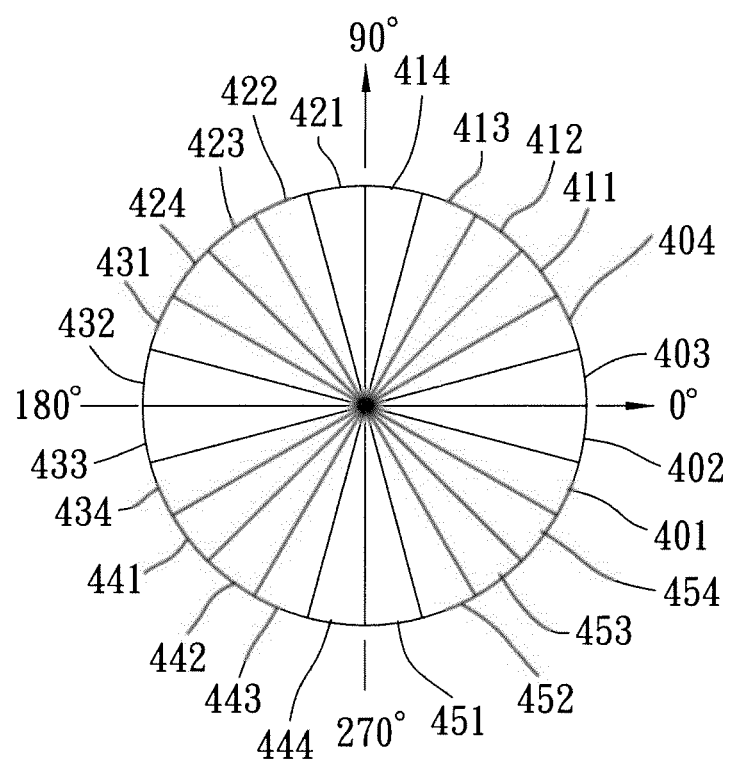
FIG. 5 is a schematic diagram illustrating sub-hue regions defined in the preferred embodiment.

Step 31: The hue region determining unit 21 is configured to determine, from a plurality of predetermined hue regions, the hue region to which the original image pixel belongs based directly on the component values of the pixel components thereof. In this preferred embodiment, the hue region is defined using inequality relationships among the component values of R, G, and B components as listed in Table 1 and shown in FIG. 4, and each hue region includes a plurality of sub-hue regions. In this embodiment, each hue region includes four sub-hue regions, as shown in FIG. 5.

TABLE 1

| Hue Region | Range of Hue Angle | Inequality Relationship |
|---|---|---|
| 40 | 330° ≤ hue < 360° 0° ≤ hue < 30° | R ≥ G > B |
| 41 | 30° ≤ hue < 90° | G > R ≥ B |
| 42 | 90° ≤ hue < 150° | G ≥ B > R |
| 43 | 150° ≤ hue < 210° | B > G ≥ R |
| 44 | 210° ≤ hue < 270° | B ≥ R > G |
| 45 | 270° ≤ hue < 330° | R > B ≥ G |

Step 32: The hue region determining unit 21 is configured to divide a range defined by the component values $max1$, $min1$ of the first and third components into a plurality of sub-ranges. Each sub-range corresponds to a respective one of the sub-hue regions.

In this preferred embodiment, the range between the component values max1, min1 of the first and third components is equally divided into four sub-ranges.

Step 33: The hue region determining unit 21 is configured to determine one of the sub-hue regions to which the original image pixel belongs according to one of the sub-ranges that has the component value of the second component falling therewithin.

As an example, assuming the original image pixel has the component values (R, G, B)=(120, 120, 20), from the inequality relationship, it is known that this original image pixel belongs to the hue region 40. The range between the component values of the first and third component 20~120 is equally divided into four parts 20~45 (corresponding to the sub-hue region 401), 45~70 (corresponding to the sub-hue region 402), 70~95 (corresponding to the sub-hue region 403), and 95~120 (corresponding to the sub-hue region 404). Since R=G=120, the component value of the second component of the original image pixel is 120, and it is determined that the original image pixel belongs to the sub-hue region 404.

Step 34: The parameter selecting unit 22 is configured to select a color enhancement parameter from a plurality of predetermined ones of the color enhancement parameters that correspond respectively to the sub-hue regions according to said one of the sub-hue regions determined in step 33.

In this preferred embodiment, the color enhancement parameters are those listed in Table 2. In other embodiment, values of the color enhancement parameters may be user-defined, and are not limited to those listed herein.

TABLE 2

| Sub-hue Region | Color Enhancement Parameter | Value |
|---|---|---|
| 403 | vcr0 | 0.90 |
| 404 | vcr1 | 0.89 |
| 411 | vcr2 | 0.88 |
| 412 | vcr3 | 0.88 |
| 413 | vcr4 | 0.90 |
| 414 | vcr5 | 0.88 |
| 421 | vcr6 | 0.87 |
| 422 | vcr7 | 0.97 |
| 423 | vcr8 | 1.04 |
| 424 | vcr9 | 1.13 |
| 431 | vcr10 | 1.14 |
| 432 | vcr11 | 1.29 |
| 433 | ver12 | 1.41 |
| 434 | vcr13 | 1.57 |
| 441 | vcr14 | 1.55 |
| 442 | vcr15 | 1.45 |
| 443 | vcr16 | 1.37 |
| 444 | vcr17 | 1.13 |
| 451 | vcr18 | 1.00 |
| 452 | vcr19 | 0.95 |
| 453 | vcr20 | 0.92 |
| 454 | vcr21 | 0.91 |
| 401 | vcr22 | 0.88 |
| 402 | vcr23 | 0.89 |

Referring to FIG. 5 and Table 2, it is known that the color enhancement parameter corresponding to the original image pixel of the example described hereinabove is vcr1 whose value is 0.89.

Step 35: The color enhancing unit 23 is configured to obtain a color enhanced pixel according to the color enhancement parameter selected in step 34 and the component values max1, mid1, min1 of the pixel components of the original image pixel, in which the color enhanced pixel is composed of a first enhanced component that corresponds to the first component and that has the largest component value max2 of the color enhanced pixel, a second enhanced component that corresponds to the second component and that has a component value mid2, and a third enhanced component that corresponds to the third component and that has the smallest component value min2 of the color enhanced pixel.

In this preferred embodiment, the component values max2, mid2, and min2 are obtained using the following equations (1), (2), and (3), respectively.

$$\max2 = \frac{(\max1 - \min1) \times vcr + (\max1 + \min1)}{2} \quad (1)$$

In which, max2 has a limitation of max2≤max1+min1. That is, when max2 obtained using equation (1) is greater than max1+min1, max2 is defined to be equal to max1+min1.

$$\min2 = (\max1 + \min1) - \max2 \quad (2)$$

In which, min2 has a limitation of min2≥0. That is, when min2 obtained using equation (2) is smaller than zero, min2 is defined to be zero.

$$mid2 = \left(\frac{mid1 - \min1}{\max1 - \min1}\right) \times (\max2 - \min2) + \min2 \quad (3)$$

The above equations (1), (2), and (3) are derived from the following equations of the hue component value H, the saturation component value S, and the luminance value L:

$$H = \frac{mid1 - \min1}{\max1 - \min1} = \frac{mid2 - \min2}{\max2 - \min2} \quad (4)$$

$$S = \frac{\max1 - \min1}{\max1 + \min1} \quad (5)$$

$$L = \frac{\max1 + \min1}{2} = \frac{\max2 + \min2}{2} \quad (6)$$

Therefore, through the image processing method of this invention, the saturation component value S of the original image pixel may be directly adjusted in RGB color space to obtain the color enhanced pixel without adjustments of the hue component value H and the luminance component value L.

The color enhanced pixel and the original image pixel belong to the same hue region, thereby the component values of the color enhanced pixel are determined. For example, assuming the original image pixel belongs to the hue region 40, the component values (R', G', B') of the color enhanced pixel are processed to be (max2, mid2, min2).

To sum up, the image processing method of this invention is implemented to process the original image pixel directly in RGB color space by the hue region determining unit 21, the parameter selecting unit 22, and the color enhancing unit 23. Compared to the conventional image processing method, the forward and reverse conversions between RGB color space and HSL color space may be omitted, thereby promoting efficiency of image processing and reducing complexity of computation, power consumption, and required chip area.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An image processing method for processing an original image pixel composed of a plurality of pixel components each having a component value, said image processing method to implemented by an image processing device and comprising:
   a) configuring the image processing device to determine, from a plurality of predetermined hue regions, the hue region to which the original image pixel belongs based directly on the component values of the pixel components thereof;
   b) configuring the image processing device to select a color enhancement parameter corresponding to the hue region determined in step a); and
   c) configuring the image processing device to obtain a color enhanced pixel according to the color enhancement parameter selected in step b) and the component values of the pixel components of the original image pixel.

2. The image processing method as claimed in claim 1, wherein, in step a), each of the hue regions has a plurality of sub-hue regions.

3. The image processing method as claimed in claim 2, wherein the pixel components include a first component having the largest component value of the original image pixel, a second component, and a third component having the smallest component value of the original image pixel, and step a) includes:
   a-1) configuring the image processing device to divide a range defined by the component values of the first and third components into a plurality of sub-ranges, each corresponding to a respective one of the sub-hue regions; and
   a-2) configuring the image processing device to determine one of the sub-hue regions to which the original image pixel belongs according to one of the sub-ranges that has the component value of the second component falling therewithin.

4. The image processing method as claimed in claim 3, wherein, in step b), the image processing device is configured to select the color enhancement parameter from a plurality of predetermined ones of the color enhancement parameters that correspond respectively to the sub-hue regions according to said one of the sub-hue regions determined in step a-2).

5. The image processing method as claimed in claim 3, wherein, in step c), the image processing device is configured to obtain, according to the color enhancement parameter selected in step b) and the component values of the pixel components of the original image pixel, the color enhanced pixel composed of a first enhanced component that corresponds to the first component and that has the largest component value of the color enhanced pixel, a second enhanced component that corresponds to the second component, and a third enhanced component that corresponds to the third component and that has the smallest component value of the color enhanced pixel.

6. The image processing method as claimed in claim 3, wherein the pixel components of the original image pixel are red-green-blue (RGB) color space components.

7. The image processing method as claimed in claim 1, wherein, in step c), the color enhanced pixel is obtained without converting the pixel components of the original image pixel to a different color space.

* * * * *